US008843499B2

(12) United States Patent
Kirk et al.

(10) Patent No.: US 8,843,499 B2
(45) Date of Patent: Sep. 23, 2014

(54) ACCELERATING DATABASE QUERIES COMPRISING POSITIONAL TEXT CONDITIONS PLUS BITMAP-BASED CONDITIONS

(75) Inventors: Steven A. Kirk, Chelmsford, MA (US); Roland F. McKenney, Billerica, MA (US); Anil K. Goel, Waterloo (CA); Evguenia A. Eflov, Waterloo (CA)

(73) Assignee: Sybase, Inc., Dublin, CA (US)

( * ) Notice: Subject to any disclaimer, the term of this patent is extended or adjusted under 35 U.S.C. 154(b) by 519 days.

(21) Appl. No.: 12/980,446

(22) Filed: Dec. 29, 2010

(65) Prior Publication Data

US 2012/0173540 A1   Jul. 5, 2012

(51) Int. Cl.
 *G06F 7/00*   (2006.01)
(52) U.S. Cl.
 USPC .......................... 707/745; 707/713; 707/747
(58) Field of Classification Search
 USPC .......................................... 707/713, 745, 747
 See application file for complete search history.

(56) References Cited

U.S. PATENT DOCUMENTS

| 5,560,007 | A | * | 9/1996 | Thai ...................... 707/999.003 |
| 5,649,181 | A | | 7/1997 | French et al. |
| 5,852,821 | A | | 12/1998 | Chen et al. |
| 5,918,225 | A | | 6/1999 | White et al. |
| 6,141,656 | A | * | 10/2000 | Ozbutun et al. .......... 707/999.01 |
| 6,490,578 | B1 | | 12/2002 | Burkhard |
| 6,615,206 | B1 | * | 9/2003 | Jakobsson et al. ..... 707/999.003 |
| 6,826,563 | B1 | * | 11/2004 | Chong et al. ................. 707/745 |
| 2007/0016612 | A1 | * | 1/2007 | James et al. ............... 707/104.1 |
| 2009/0171916 | A1 | | 7/2009 | Kirk et al. |
| 2009/0171936 | A1 | | 7/2009 | Kirk et al. |
| 2012/0078880 | A1 | | 3/2012 | Kirk et al. |

OTHER PUBLICATIONS

Chan, Chee-Yong, and Ioannidis, Yannis E., "Bitmap index design and evaluation," Proceedings of the 1998 ACM SIGMOD International Conference on Management of Data, p. 355-366, United States (1998).
Grossman, D. A., "Integrating Structured Data and Text: A Relational Approach," Ph.D. Thesis, George Mason University, United States (Fall Semester 1995).
O'Neil, Patrick and QUASS, Dallan, "Improved Query Performance With Variant Indexes," Proceedings of the 1997 ACM SIGMOD International Conference on Management of Data, p. 38-49, United States (1997).
O'Neil, Patrick E., "Model 204 Architecture and Performance," Proceedings of the 2nd International Workshop on High Performance Transaction Systems, p. 40-59, United Kingdom (1987).

* cited by examiner

*Primary Examiner* — Khanh Pham
*Assistant Examiner* — Jieying Tang
(74) *Attorney, Agent, or Firm* — Sterne Kessler Goldstein & Fox P.L.L.C.

(57) ABSTRACT

A system, method, and computer program product are provided for improving performance of positional text conditions in concert with bitmap-based conditions. This is accomplished, for example, by focusing positional text condition evaluation to candidate rows based on a bitmap resulting from application of a prior condition. Additionally, the result of a positional text condition may itself be provided in the form of a bitmap to accelerate further bitmap-based condition processing.

18 Claims, 13 Drawing Sheets

ACCELERATING DATABASE QUERIES COMPRISING POSITIONAL TEXT CONDITIONS PLUS BITMAP-BASED CONDITIONS

BACKGROUND OF INVENTION

1. Field of the Invention

The present invention relates generally to databases and, in particular, evaluation of database queries.

2. Description of the Background Art

Information is typically retrieved from a database through the use of queries. A database management system (DBMS) controls the creation, maintenance, and use of a database by responding to queries. When the DBMS receives a query, it evaluates the query to determine which information is being requested from the database, and responds to the query with the requested information.

One way to specify the information being requested in a query is through the use of a positional text condition. These are typically either phrase conditions where a set of search terms must collectively appear in a precise order within a column cell value of the database, or a proximity condition where a set of search terms must appear within a specific distance of each other within a column cell value of the database, in order to satisfy the condition.

In the case of phrase conditions, these are typically expressed by requesting result rows in which a particular column of a table in the database (e.g., SERVICE_ORDER.PROBLEM_DESCRIPTION) contains a phrase in the precise ordering specified (e.g., "unable to connect"). In the case of proximity conditions, these are typically expressed by requesting result rows in which a particular column of a table in the database (e.g., SERVICE_ORDER.PROBLEM_DESCRIPTION) contains one or more search terms within a certain number of words of each other (e.g., the word "connection" is found within four words of the word "dropped").

There has been an interest among database vendors, Internet search vendors, and other specialty information retrieval product vendors in the ability to quickly identify a set of documents that each contain some specific phrase. Similarly, there is also interest in quickly identifying a set of documents containing a specific set of words where those words are found within a specified distance from each other. These functions are commonly accomplished by the aforementioned phrase conditions and proximity conditions, respectively.

Additionally, there has been recent interest in the use of bitmap-based method for evaluation of a set of conditions over columns from a single table. These bitmap-based methods enable the efficient combination of the effects of multiple conditions, which are each using some index-based evaluation method, until finally the precise set of rows relevant to a specified query has been identified and can then be projected.

Ideally, it would be useful to improve processing of queries that involve positional text conditions and conditions that can be represented using bitmap-based methods for evaluation. Accordingly, what is desired is efficient processing of sets of conditions that include a positional text condition.

SUMMARY OF INVENTION

Embodiments of the invention include a method comprising retrieving a search term bitmap representing rows in a database comprising a search term, identifying candidate rows based on the search term bitmap, evaluating position information for the search term for the candidate rows, and providing a set of result rows satisfying a condition based on the position information for the search term.

Additional embodiments of the invention include a computer-usable medium having instructions recorded thereon that, if executed by a computing device, cause the computing device to perform a method comprising retrieving a search term bitmap representing rows in a database comprising a search term, identifying candidate rows based on the search term bitmap, evaluating position information for the search term for the candidate rows, and providing a set of result rows satisfying a condition based on the position information for the search term.

Further embodiments of the invention include a system comprising a memory and a processor configured to retrieve a search term bitmap representing rows in a database comprising a search term, identify candidate rows based on the search term bitmap, evaluate position information for the search term for the candidate rows, and provide a set of result rows satisfying a condition based on the position information for the search term.

Embodiments of the invention also include a method comprising retrieving position information for a search term in a database, identifying candidate rows based on a prior condition bitmap, evaluating position information for the search term for the candidate rows, and providing a set of result rows satisfying a positional text condition based on the position information for the search term.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
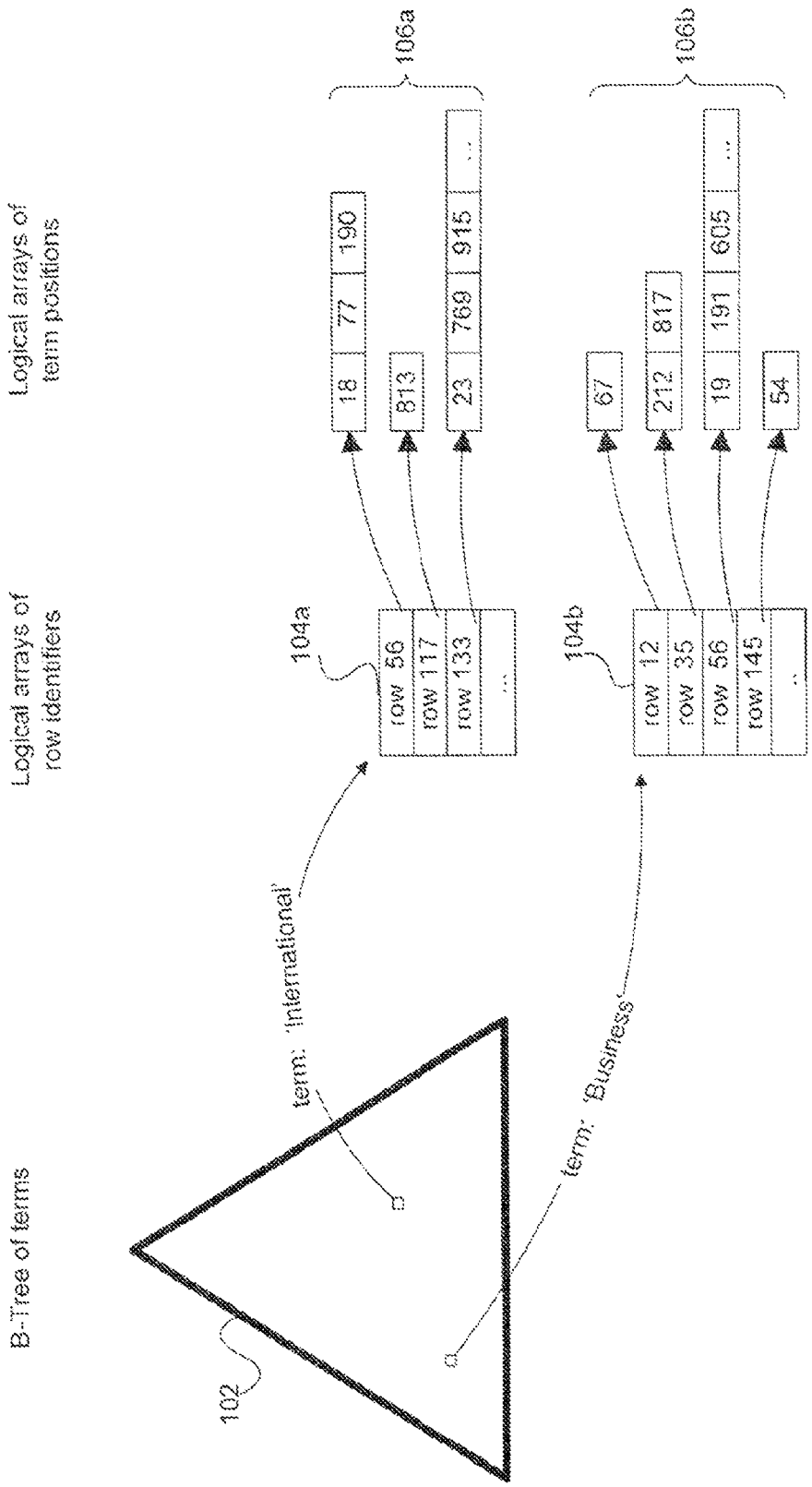
FIG. 1 illustrates a positional text index structure, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, and within the scope and spirit of the present invention.

Efficient handling of positional text conditions can be accomplished through the use of data structures designed specifically to provide easy identification of the position of a term. Most beneficially, such a data structure would allow for a look up of a particular term, and return positional information for that term, in a programmatically efficient manner. FIG. 1 illustrates such a positional text index structure 100, in accordance with an embodiment of the present invention. In positional text index structure 100, each of the various terms present within the column being searched are stored within a B-tree of terms 102. Each term within B-tree 102 links to a corresponding logical array of row identifiers 104*a* and 104*b*. For example, as illustrated in FIG. 1, a search for the term "International" in B-tree 102 produces array 104*a*, whereas a search for the term "Business" in B-tree 102 produces array 104*b*.

In the time taken to search B-tree 102 (usually a worst-case O(log n) operation), it is possible to obtain a list of all rows within a column being searched in which the search term appears. For example, as shown in FIG. 1, the term "International" appears at rows 56, 117, 133, etc. based on the row identifiers held in array 104*a*. Using this information, it is possible to reference an additional data structure to identify position information within those rows in which the term is present. Term position arrays 106*a* corresponding to respective row identifiers in array 104*a*, and term position arrays 106*b* corresponding to respective row identifiers in array 104*b*, list the positions at which the particular term occurs within the corresponding row. Continuing the example shown in FIG. 1, the term "International" appears at positions 18, 77, and 190 within row 56 of the column being searched.

Figure 2:
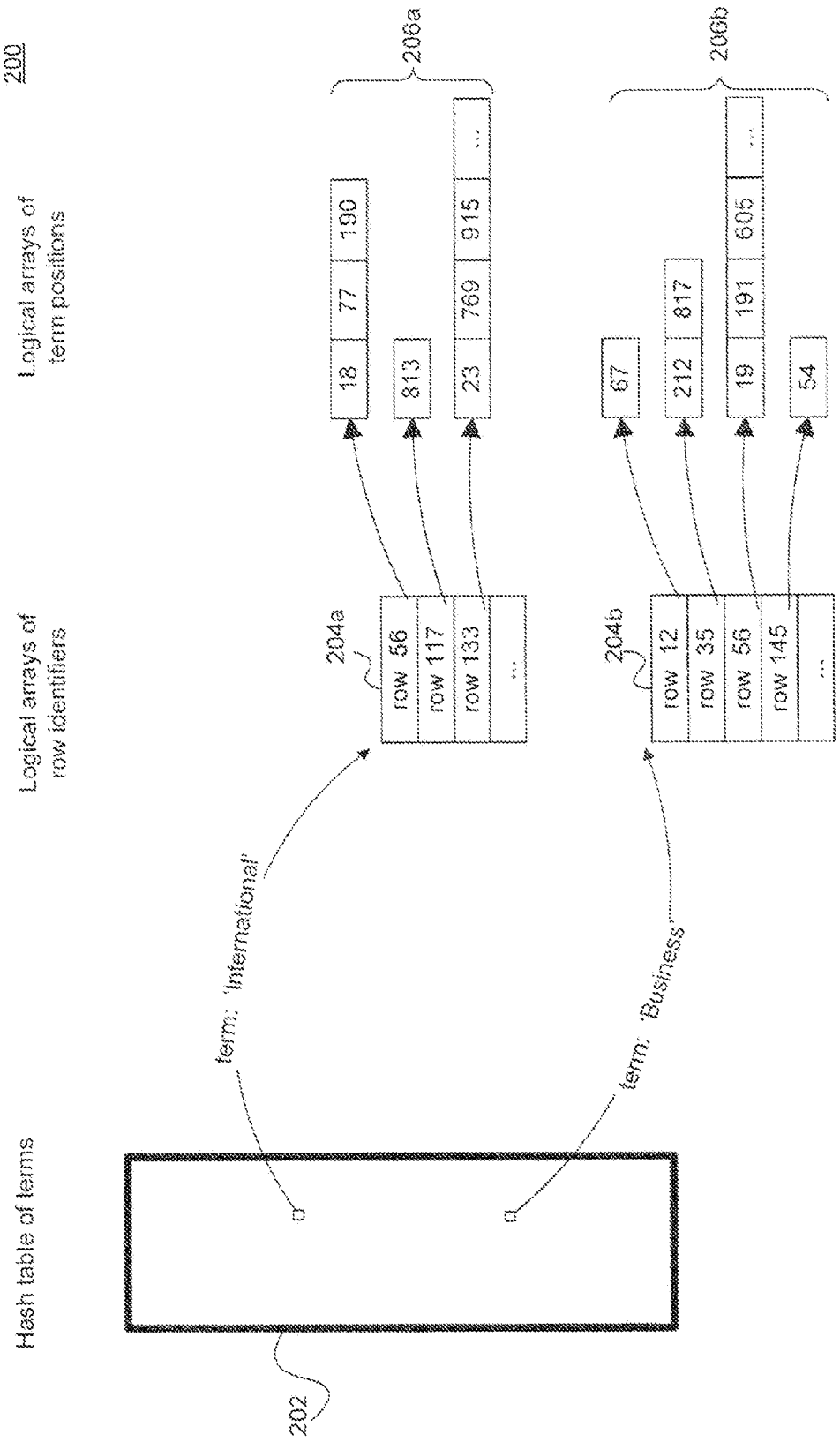
FIG. 2 illustrates a positional text index using a hash table, in accordance with an embodiment of the present invention.

One skilled in the relevant arts will appreciate that the terms used to describe the various data structures being utilized in FIG. 1, and throughout this disclosure, are provided by way of example, and not limitation. For example, the term array may instead refer to a linked list, or any other data structure that could accommodate the data therein. For example, FIG. 2 illustrates a positional text index structure 200 using a hash table 202, in accordance with an embodiment of the present invention. Hash table 202 is utilized instead of B-tree 102 of FIG. 1 in order to look up row identifier arrays 204*a* and 204*b* for a particular search term. As in the example of FIG. 1, the rows of row identifier arrays 204*a* and 204*b* are each associated with a corresponding term position array 106*a* and 106*b* indicating the position(s) of the search term within a row.

Figure 3:
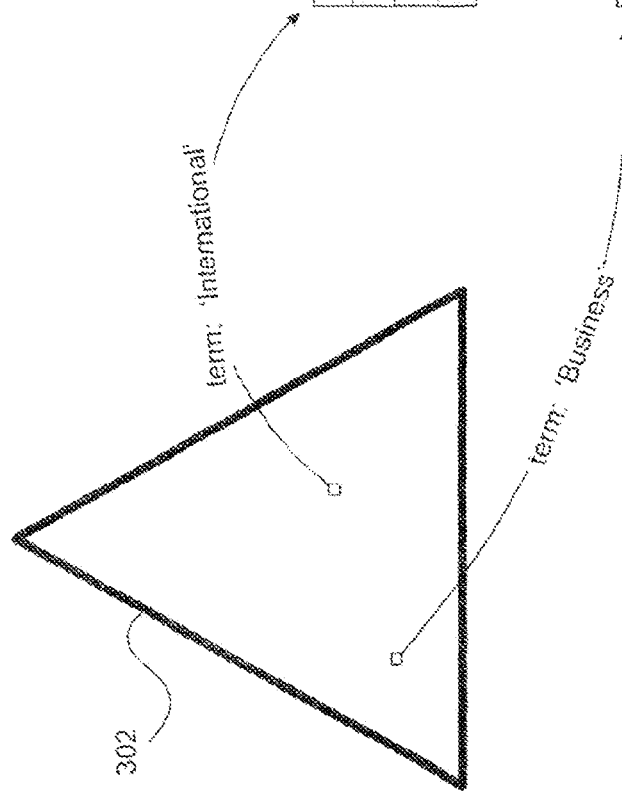
FIG. 3 illustrates a further positional text index structure using a combined structure for row and position information, in accordance with a further embodiment of the present invention.

FIG. 3 illustrates a further positional text index structure 300 using a combined structure for row and position information, in accordance with a further embodiment of the present invention. In this non-limiting example, a B-tree 302 is used to look up a search term and identify its corresponding row and position information structure 304*a* and 304*b*. As shown in FIG. 3, this structure may comprise an array 304*a* and 304*b* for each row including a row number and a value for the number of position entries associated with that row, which is then followed by the values for the position entries. For example, FIG. 3 shows that the term "International" can be found in B-tree 302, its entry referencing array 304*a*. In turn, array 304*a* includes information for each of the rows in which the term "International" appears (e.g., rows 56, 117, 133, etc.) and the number of times the term appears within each row (e.g., 3, 1, 7, etc. respectively). This is followed by the position information for each of the terms.

One skilled in the relevant arts will appreciate that position information may be stored and interpreted in different ways. For example, position information may correspond to a character position, such that in the non-limiting example of FIG. 3 for the term "International" at row 56, positions 18, 77, and 190 correspond to a character position within the entry of row 56 (i.e., the first instance of "International" occurs at the 18th character of the cell at row 56, the second at the 77th character, etc.). In another example, the position information may correspond to a word position, such that position 18 means the term "International" is the 18th word in the cell at row 56. These interpretations are provided by way of example, and not limitation.

Figure 4:
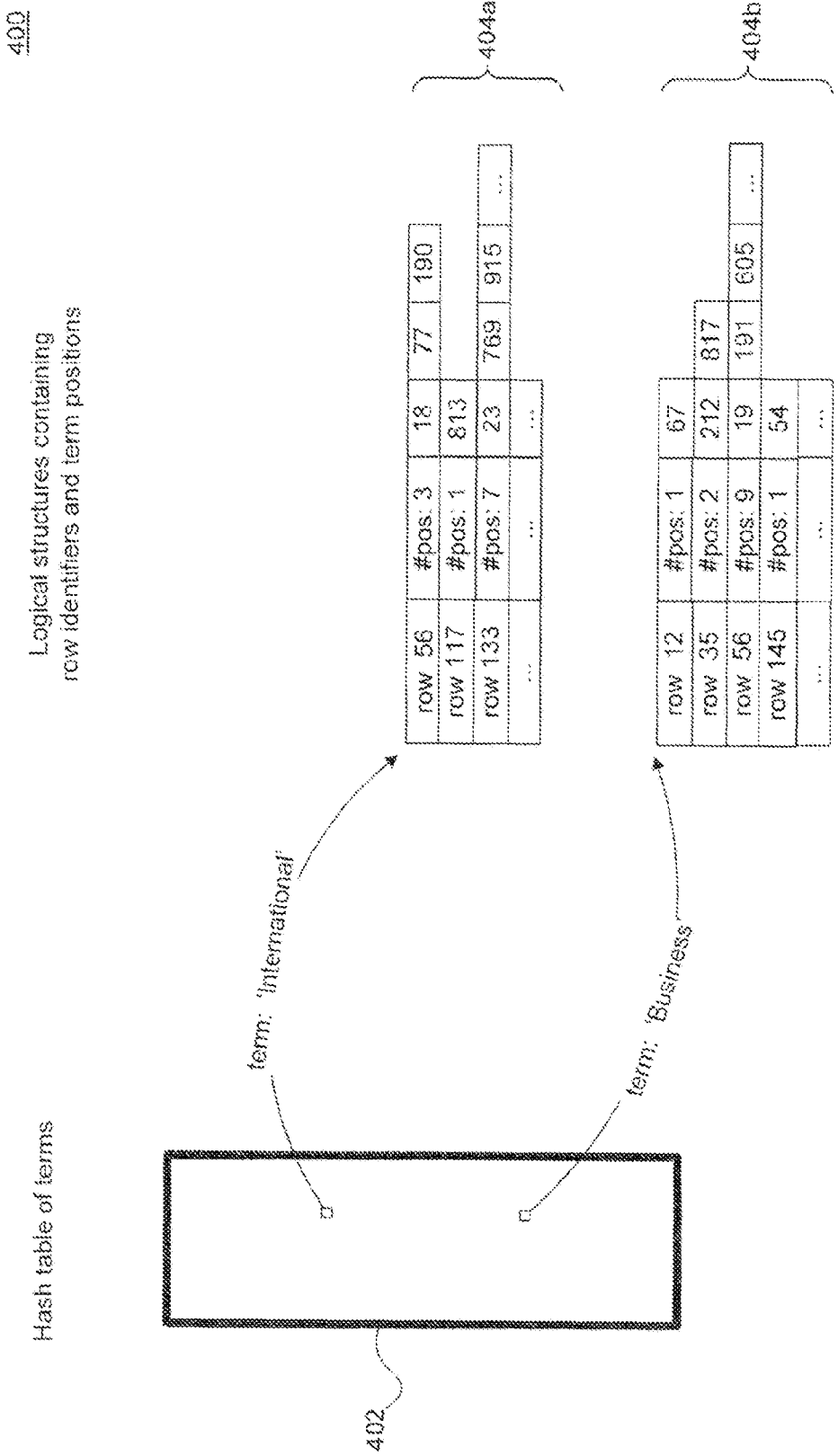
FIG. 4 illustrates an additional positional text index structure utilizing a combined structure for row and position information and a hash table of terms, in accordance with an embodiment of the present invention.

FIG. 4 illustrates an additional positional text index structure 400 utilizing a combined structure 404*a* and 404*b* for row and position information, but instead using a hash table of terms 402, in accordance with an embodiment of the present invention. As noted before, one skilled in the relevant arts will appreciate that a number of techniques exist for organizing terms and information regarding rows and positions for each term.

II. Bitmap-Based Conditions

In modern database systems, bitmap-based conditions are used, for example, to reduce the amount of work necessary for a second and subsequent condition. An example of the use of bitmaps to accelerate query processing is provided by commonly-owned U.S. patent application Ser. No. 12/342,756 entitled "Method for Accelerating Queries Containing Local Range Conditions Using Subtraction of Cumulative Bitmaps", filed Dec. 23, 2008, which is incorporated by reference herein in its entirety. In accordance with an embodiment of the present invention, a bitmap produced by resolving a condition may have a value (usually a binary '0' or '1' value) corresponding to each row in a column, the value indicating whether the corresponding row meets or does not meet the condition. Various resulting bitmaps can be compared in different ways to accelerate further condition processing (e.g., an operation such as "x AND y" can be resolved by finding the intersection of bitmaps produced by resolving conditions "x" and "y", resulting in a bitmap that identifies the rows that meet both conditions).

Although the advantages of bitmap-based conditions are understood, there has been no mechanism by which to realize their gains in the kinds of positional text searches described above. In particular, when traversing the data structures described in FIGS. 1-4, there is no advance information regarding which rows (such as from data structures 104a and 104b of FIG. 1) are of interest. For example, if evaluating a condition such as "x AND ('International' NEAR 'Business')", where evaluating a condition for "x" produces a bitmap denoting rows that meet the condition, there is no mechanism available to narrow down the rows being evaluated in the positional text index structures. In the case of FIG. 1, array 104a needs to be traversed, possibly fully, in order to learn whether each and every row satisfying condition "x" is present.

There is also no previous mechanism by which an index containing term position information can utilize bitmaps within the index to more quickly evaluate a positional text query in order to produce a bitmap result, which can in turn be used to accelerate further condition evaluations. These inefficiencies are resolved by supplying bitmap information through a number of mechanisms that will be described in further detail below.

One skilled in the relevant arts will recognize that the use of bitmaps in order to represent rows that satisfy a condition is provided by way of non-limiting example, and other data structures can be used instead to represent rows that do or do not satisfy a condition.

III. Supplying Bitmap Information for Positional Text Queries

Figure 5A:
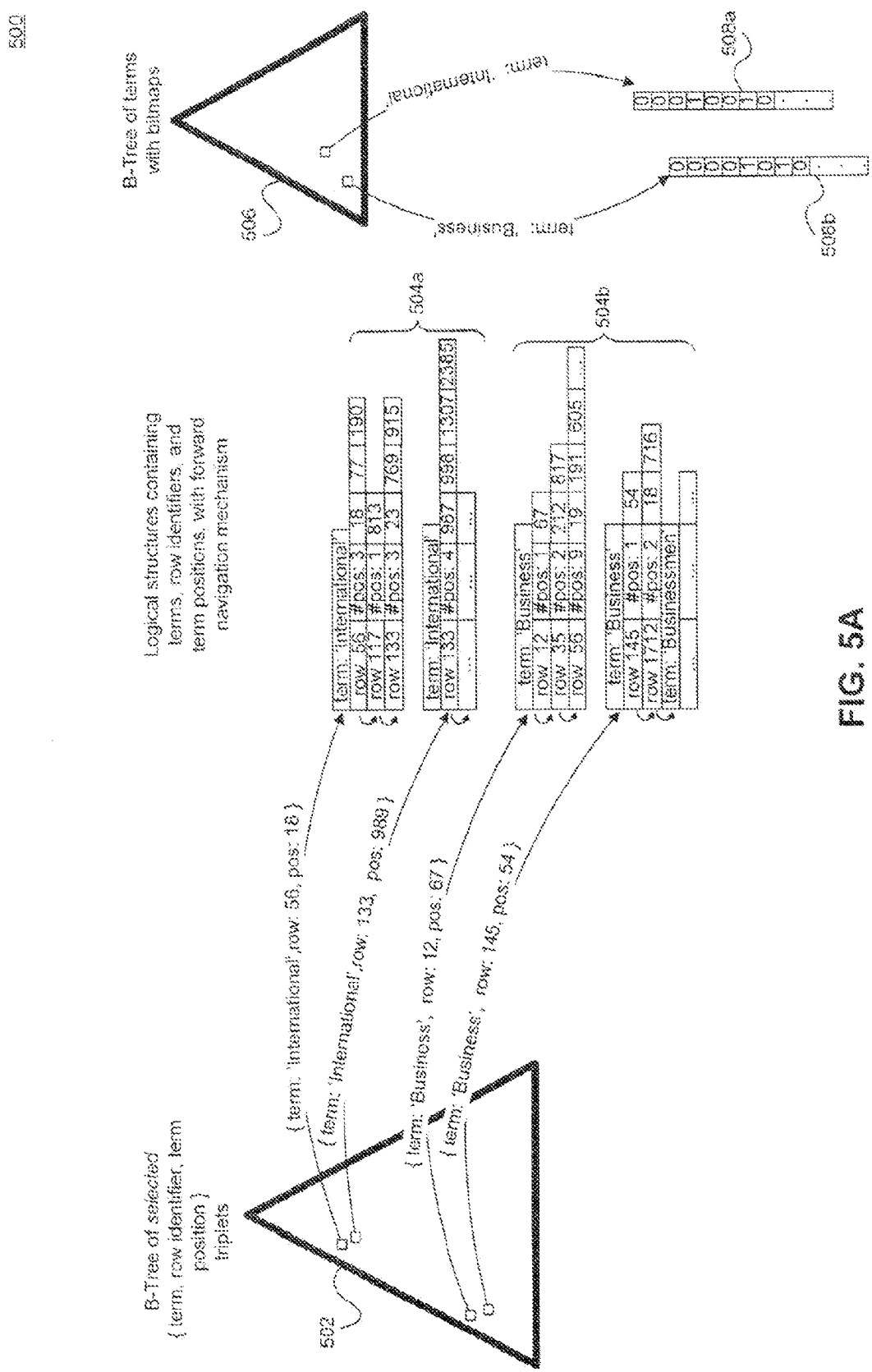
FIG. 5A illustrates a new form of positional text index structure that includes bitmap information, in accordance with an embodiment of the present invention.

FIG. 5A illustrates a new form of positional text index structure 500 that includes bitmap information, in accordance with an embodiment of the present invention. Positional text index structure 500 comprises a B-tree 502 of triplets (term, row, and position within the row), each triplet referencing corresponding logical structures 504a and 504b storing position information.

A separate structure, such as a B-tree of terms 506, is used to reference a set of bitmaps 508a and 508b. By way of non-limiting example, a search for a term such as "International" in B-tree 506 identifies a bitmap 508a that indicates whether each row of a particular column does or does not contain the search term. These bitmaps 508a and 508b can be intersected and then combined with a bitmap representing the set of rows that satisfied all preceding conditions. The resulting bitmap can then be used as a guide to skip portions of the positional text index structure (e.g., B-tree 502) related to any row which either does not contain all of the relevant search terms or does not satisfy all the preceding conditions.

By intersecting a bitmap 508a with a bitmap representing the prior conditions, a set of rows meeting both those preceding conditions and containing the term "International" is identified. This resulting set of rows may be presented in the form of a further bitmap. It is then possible to combine this resulting bitmap with a bitmap 508b to identify the set of rows which satisfied the preceding conditions and which contain both the term "International" and the term "Business". This bitmap can then be used to constrain the set of rows to examine within the term position data structure 502 to only those rows that satisfied the preceding conditions and contained both of the search terms. That term position information, such as 504b, is then used to identify the set of rows which also satisfied the positional search constraint. By way of non-limiting example, if a prior condition matched only rows 56 and 57, and the positional term condition was to search for the phrase "International Business", with a search for the term "International" in B-tree 506 producing a bitmap identifying only rows 56, 117, and 133 as matches and a search for the term "Business" in 506 producing a bitmap indentifying only rows 12, 35, 56, 145, and 1712, then only row 56 (the intersection of the three bitmaps) would be of interest. Then, B-tree 502 would be searched to identify any nodes corresponding to the term "International" or "Business" and row 56 in order to obtain the position information corresponding to that row and ascertain whether that row contained the phrase "International Business".

In a further non-limiting exemplary embodiment as shown in FIG. 5A, B-tree 502 indexes only a selection of {term, row identifier, term position} triplets in order to conserve space usage by B-tree 502. A forward navigation mechanism within logical structures 504a and 504b allows for access to rows and positions that would be located between those points referenced by the selected triplets present in B-tree 502.

Figure 5B:
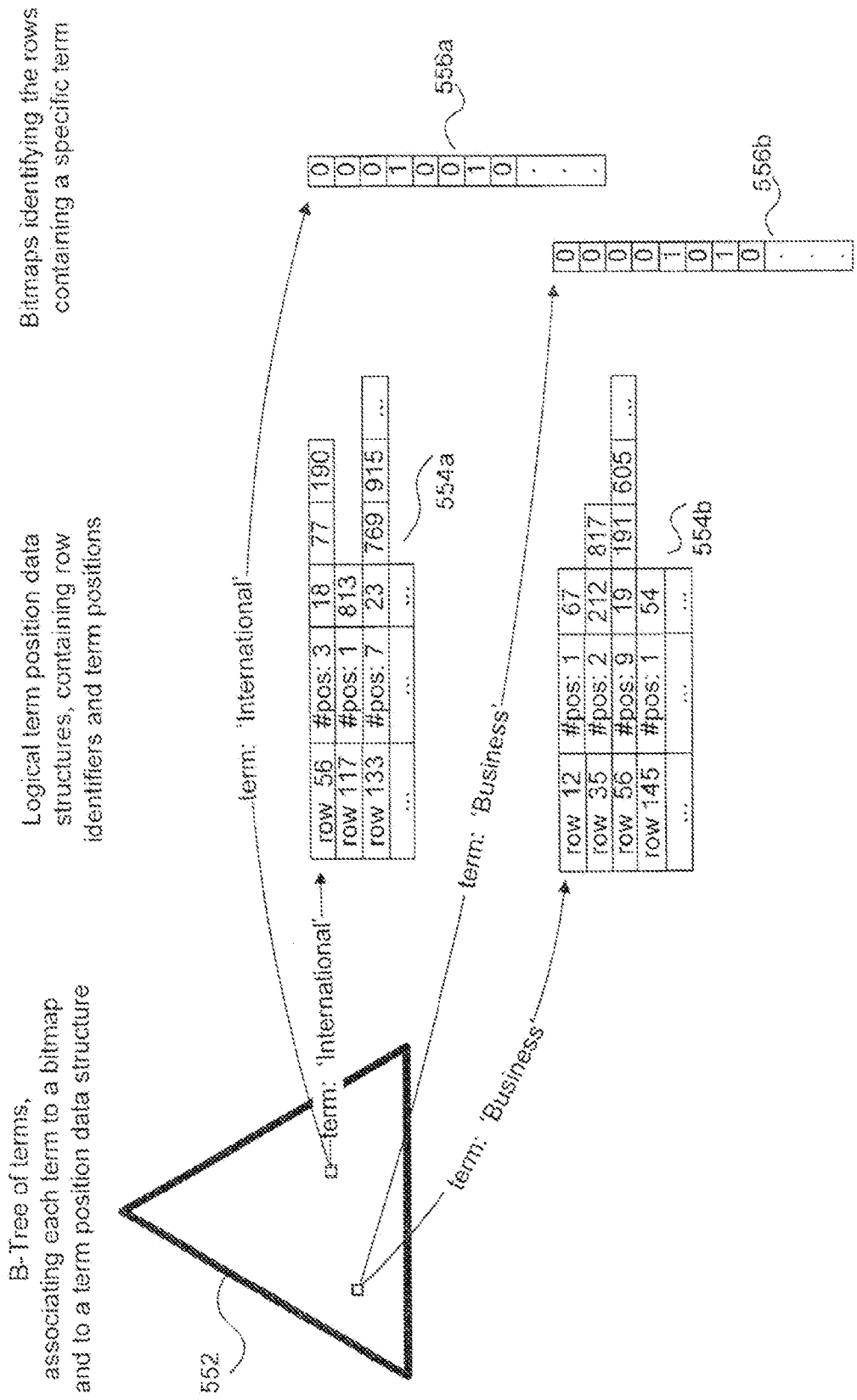
FIG. 5B illustrates a new form of positional text index structure that includes a reference to bitmap information and term position data structures from the same data structure, in accordance with an embodiment of the present invention.

One skilled in the relevant arts will appreciate that other methods of accessing the bitmaps identifying rows containing a specific term can be used, and are contemplated herein. For example, FIG. 5B illustrates a new form of positional text index structure 550 that includes a reference to bitmap information and term position data structures from the same data structure, in accordance with an embodiment of the present invention. Whereas FIG. 5A includes a B-tree 502 referencing logical structures 504a and 504b storing position information, and a separate B-tree 506 referencing bitmaps 508a and 508b, FIG. 5B instead uses a single B-tree 552 keyed only by term and referencing both logical structures 554a and 554b storing position information as well as bitmaps 556a and 556b. As a result, searching B-tree 552 for a particular term such as "International" identifies both the corresponding bitmap 556a and the corresponding logical structure 554a storing position information.

It would be understood by one skilled in the relevant arts that reference to the application of positional text index structure 500 of FIG. 5A may instead utilize positional text index structure 550 of FIG. 5B, or any other data structure for obtaining logical structures storing position information and corresponding term bitmaps.

Figure 6:
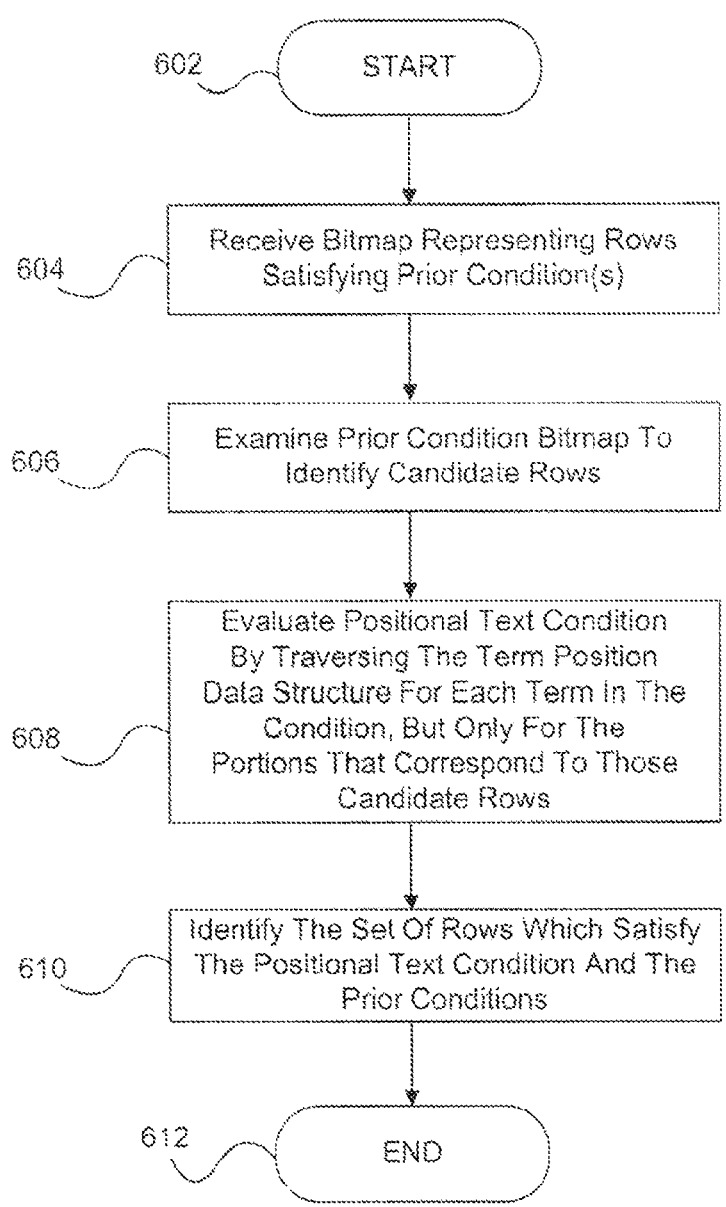
FIG. 6 is a flowchart illustrating steps by which bitmaps corresponding to search terms are used to accelerate query processing, in accordance with an embodiment of the present invention.

FIG. 6 is a flowchart 600 illustrating steps by which bitmaps corresponding to the set of rows satisfying earlier conditions are used to accelerate query processing for positional text conditions, in accordance with an embodiment of the present invention. The method begins at step 602 and proceeds to step 604 where a bitmap representing result rows for prior conditions is obtained. Then at step 606, that prior conditions bitmap is used to identify a set of candidate rows. At step 608, the positional term condition is evaluated by traversing (simultaneously, in an embodiment) the term position data structure for each term, but only for those candidate rows. By way of non-limiting example, suppose the positional term condition is searching for the phrase "International Business", and further suppose that earlier conditions were satisfied only by rows 56 and 307. Then a term position data structure, such as that described in FIG. 1, would be examined for the term "International" and the term "Business" to find the position data structure for each term which in this case would correspond to structures 104A and 104B. These position structures would then be traversed, but only those portions of the term positions (106A and 106B) that correspond to the candidate rows 56 and 307 would be examined. The position constraint, in this case that "International" is immediately followed by "Business" is then evaluated using those structures, and in step 610 those rows which have satisfied both the prior conditions and the positional text condition are thereby identified. The method then ends at step 612.

Those skilled in the relevant arts will appreciate that the method described in FIG. 6 is applicable regardless of the specific form of the term position data structure, including those forms described in FIGS. 1, 2, 3, 4, 5A, 5B, 8, 9, 10, and 11.

The results provided at step 610 may be in the form of a further bitmap result, although one skilled in the relevant arts will appreciate that other data structures may be provided. By providing the result as a bitmap, however, the result can itself become the bitmap representing result rows for prior conditions of step 604 for any subsequent operation, including subsequent executions of flowchart 600 or other condition tests.

Although the aforementioned examples are directed to positional text information on a single column, one skilled in the relevant arts will appreciate that this information may span multiple columns. By way of non-limiting example, B-tree 502 may encode logical quadruplets (further including a column identifier), or column information may be otherwise encoded within the position information.

IV. Positional Text Query Execution

Returning to FIG. 5A, it is noted that encoding logical triplets including position information in B-tree 502 provides additional flexibility for resolving positional text queries. For example, if the query is interested in identifying any row in which the term "International" is within four words of the term "Business", the position information in B-tree 502 can be used to go more directly to candidate positions. Logical structures 504a and 504b are provided, in accordance with an exemplary embodiment of the present invention, with a forward navigation mechanism allowing a reference for triplet {term, row, position} to begin at the identified row and position for the logical structure 504 corresponding to the search term. One skilled in the relevant arts will recognize that using triplets including position information within B-tree 502 may be omitted, and alternative embodiments are described in further detail below.

Figure 7:
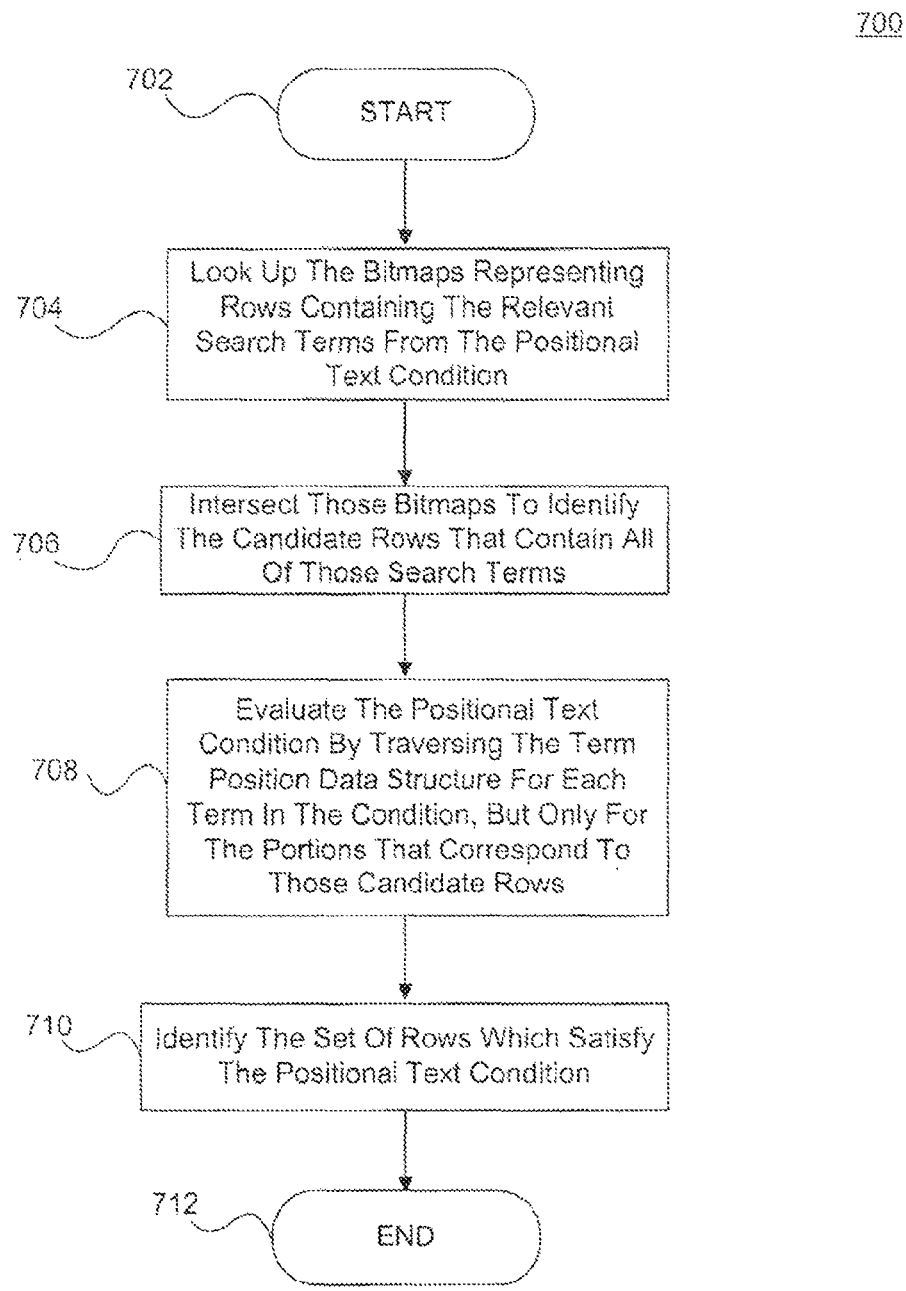
FIG. 7 is a flowchart illustrating steps by which a query comprising a positional text condition is evaluated using the positional text structure of FIG. 5, in accordance with an embodiment of the present invention.

FIG. 7 is a flowchart 700 illustrating steps by which a query comprising a positional text condition is evaluated using the new form of positional text structure 500 of FIG. 5A, in accordance with an embodiment of the present invention. The method begins at step 702 and proceeds to step 704 where bitmaps, such as those identified as 508a and 508b, are looked up based on the first and second search terms. In the context of positional text structure 500, B-tree 506 is searched for the first and second search terms in order to identify bitmaps 508a and 508b. One skilled in the relevant arts will appreciate that the use of two search terms is provided by way of non-limiting example, and a positional text condition may involve any number of search terms (1 to N). By way of further example, a positional text condition involving two terms may be of the form "term X is within N words of term Y", and identifying any rows for which this condition is true.

The method then proceeds to step 706, where a set of candidate rows is identified. The candidate rows would include any rows in which the first search term is present, as provided by bitmap 508a, and in which the second search term is present, as provided by bitmap 508b. In this non-limiting example, these candidate rows could be determined by identifying the intersection of bitmaps 508a and 508b. As noted before, the positional text condition may involve a single search term (in which case only the term's corresponding bitmap would be used) or multiple search terms (in which case all of the terms' corresponding bitmaps may be considered). It would be understood by one skilled in the relevant arts that the use of the bitmap for any given specific term present in the positional term condition is not required for correct functioning of this invention and may therefore be avoided if the cost of using that bitmap is expected to exceed the costs if it is not used, for example if a term such as "and" is specified as part of the condition and that term is known to be contained within nearly every row. In accordance with a further embodiment of the present invention, the candidate rows can be refined by any prior conditions, also represented as a bitmap (see, e.g., flowchart 600 of FIG. 6), by identifying rows present in the set of candidate rows and the prior conditions bitmap.

At step 708, B-tree 502 is traversed to located position information 504a for the first search term and position information 504b for the second search term. These two position data structures are traversed simultaneously to search for rows where the terms occur in the specified position relationship to each other, for example in the phrase search "International Business", the specified position relationship is that the term "International" is one position before the position of the term "Business". However, in accordance with this embodiment of the present invention, to accelerate the search, only rows matching the set of candidate rows are considered. In accordance with a further embodiment of the present invention, any position constraint (e.g., a position proximity range) may be specified to further limit the selected triplets from B-tree 502.

In accordance with the further embodiment as illustrated in FIG. 5A, position information examined within step 708 can be utilized to further narrow those triplets analyzed. For example, if the first search term is found only in row 56 at position 18, and the query requires that the second search term occur within four words of the first search term, additional efficiency can be obtained by only looking at those triplets matching {second search term, row 56, positions 14-22}. By providing direct access using these triplets in B-tree 502 and the forward navigation mechanism of logical structures 504, it is possible to further narrow the search for the second search term. However, it is possible to perform the search for both the first and second search terms without the position triplet, as will be further described in additional embodiments below.

At step 710 the set of rows that have satisfied the positional text condition are then identified. As previously noted, one skilled in the art would recognize that this set of rows may be represented as a bitmap, which would then enable the results of this condition to be utilized to accelerate any subsequent positional text conditions as per FIG. 6, or to accelerate other types of conditions. The method ends at step 712.

V. Alternative Positional Text Index Structures

As previously noted, the use of B-tree 502 of FIG. 5A indexed by a {term, row, position} triplet (or {term, row, column, position} quadruplet) is provided by way of non-limiting example. Other mechanisms may be used in conjunction with the term bitmaps 508a and 508b from B-tree 506 (or other data structure for organizing the term bitmaps) to accelerate positional text condition evaluation. The method described in the flowchart on FIG. 7 is applicable to any text index data structure containing a bitmap per term in addition to term position data, regardless of the navigation mechanism required to find the constituent components. Thus, in an alternate embodiment the data structure described in FIG. 5B could be used with the flowchart described in FIG. 7 where the term bitmaps 556a and 556b are found in step 704 and then used in step 706.

Figure 8:
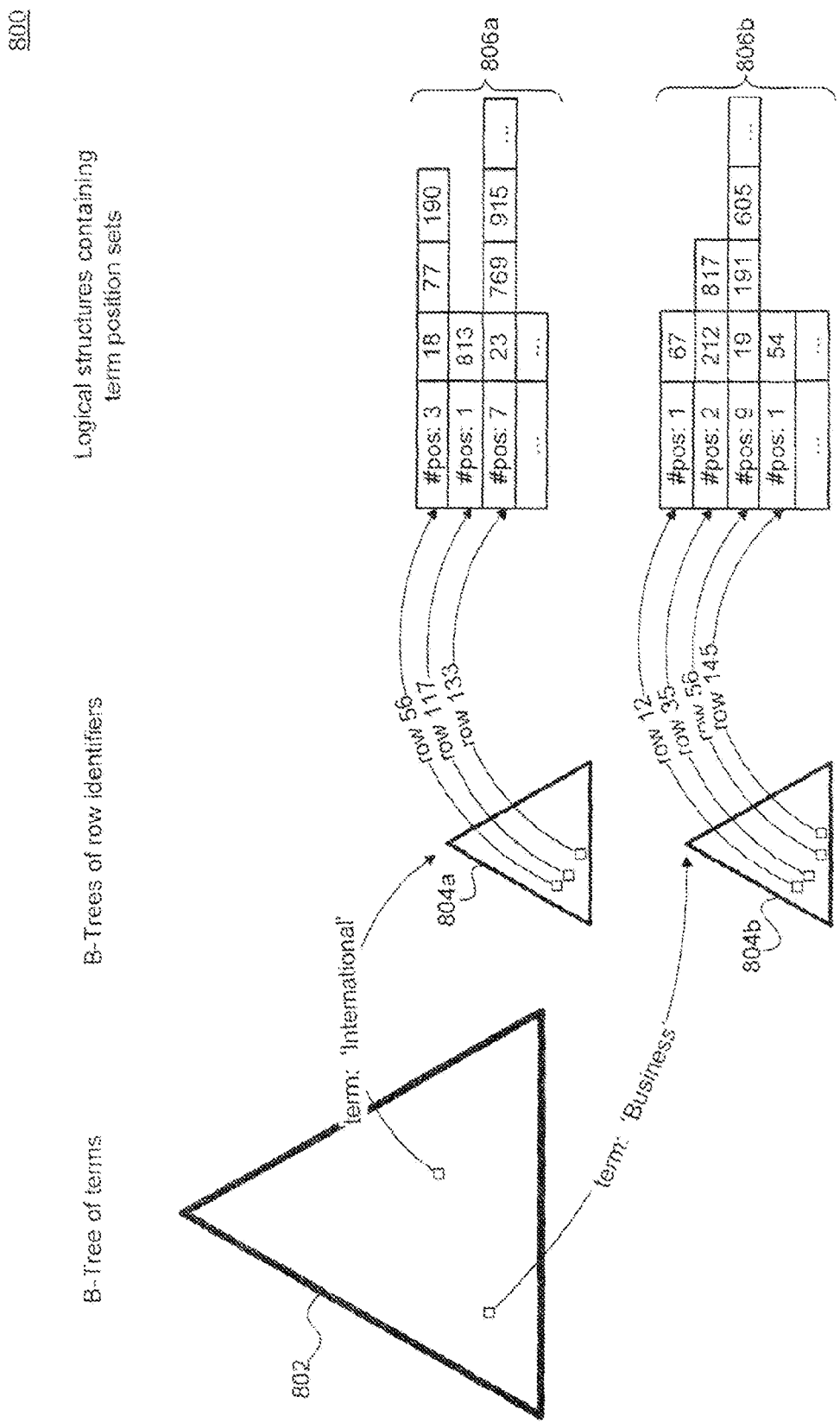
FIG. 8 illustrates a positional text index structure using B-trees of row identifiers, in accordance with an embodiment of the present invention.

FIG. 8 illustrates a positional text index structure 800 using B-trees of row identifiers, in accordance with an embodiment of the present invention. As in prior non-limiting examples, the available search terms are organized in a B-tree 802. However, in this embodiment, B-tree 802 is indexed only by the search terms, such as "International" or "Business" as shown in the example of FIG. 8. The corresponding nodes in B-tree 802 comprise a reference to an additional B-tree of row identifiers 804a and 804b. These B-trees of row identifiers 804a and 804b comprise entries for each row in which the corresponding search term appears. Traversing B-trees 804a and 804b to locate a particular row provides a reference to that row's position information 806a and 806b. In the example of FIG. 8, the term "International" located in B-tree 802 references B-tree of row identifiers 804a, which in turn comprises a reference to row 56, which itself in turn comprises a reference to position information 806a for the term "International" at row 56 (e.g., '#pos: 3', '18', '77', '190', denoting the term appears in three positions (18, 77, and 190) within row 56).

The use of a bitmap, such as bitmaps 508a and 508b of FIG. 5A, with or without combination with bitmaps representing prior conditions, as in step 706 of FIG. 7, can be used to determine which nodes within the B-tree of row identifiers 804a are of interest. For example, the candidate rows determined at step 706 of FIG. 7 can be looked up within B-tree of row identifiers 804a to determine position information 806a only for those candidate rows that are present within B-tree of row identifiers 804a.

Figure 9:
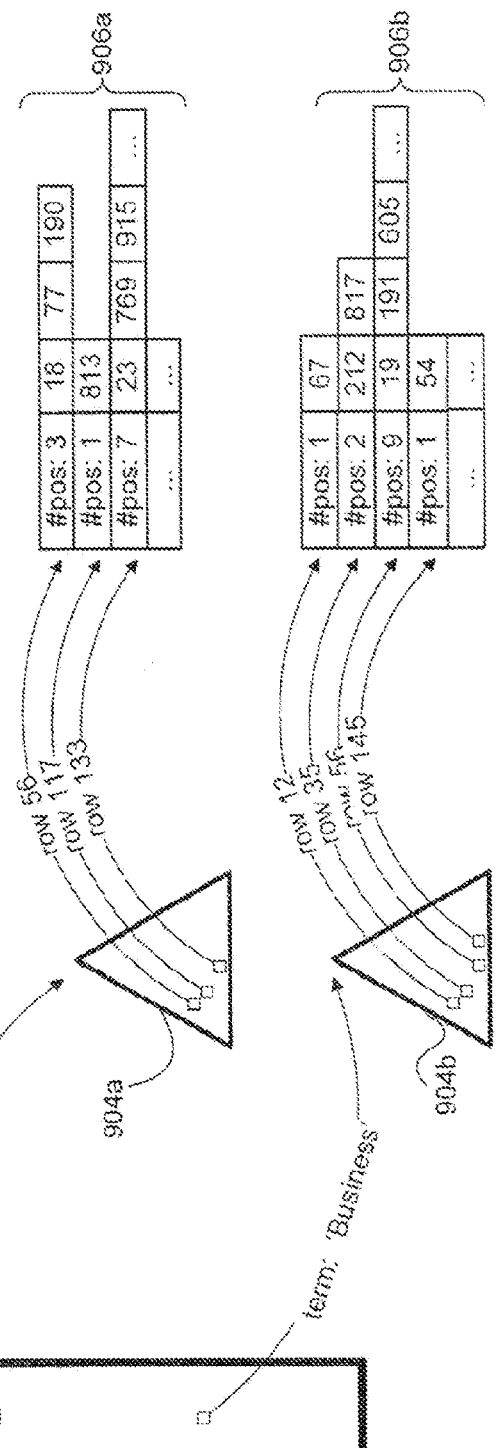
FIG. 9 illustrates an alternative positional text index structure using a hash table of terms, in accordance with a further embodiment of the present invention.

As previously discussed, one skilled in the relevant arts will appreciate that a variety of different data structures can be utilized in place of the data structures disclosed herein, and the particular data structures are provided by way of non-limiting example. FIG. 9 illustrates an alternative positional text index structure 900 using a hash table of terms, in accordance with a further embodiment of the present invention. In positional text index structure 900, the available search terms are accessible through hash table 902. Similarly to positional text index structure 800 of FIG. 8, the hash table of terms 902 references a corresponding B-tree of row identifiers 904a and 904b for each search term, and the row identifiers each reference corresponding term position sets 906a and 906b.

Figure 10:
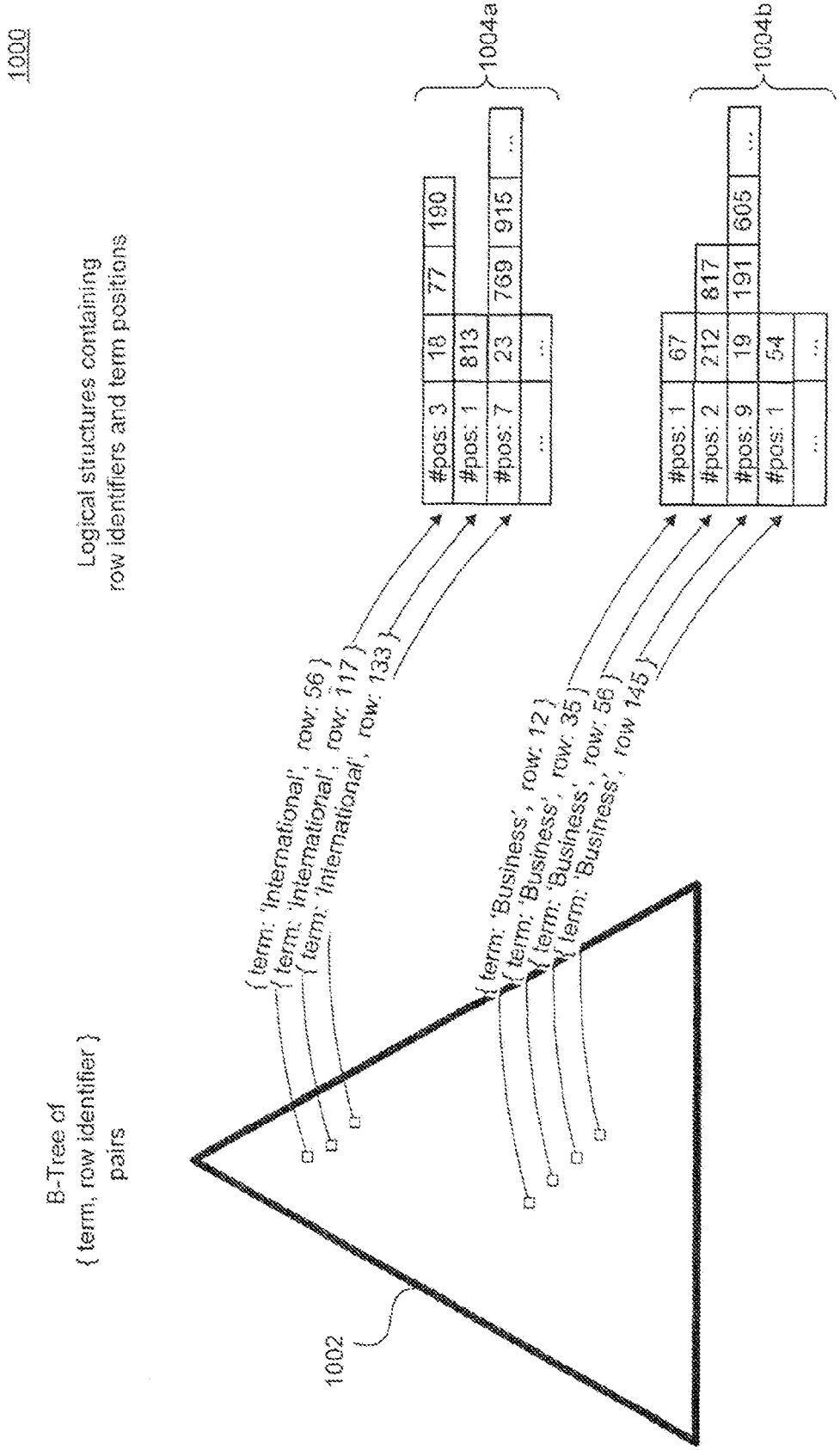
FIG. 10 illustrates a further positional text index structure using a B-tree of term and row identifier pairs, in accordance with a further embodiment of the present invention.

FIG. 10 illustrates a further positional text index structure 1000 using a B-tree of term and row identifier pairs, in accordance with a further embodiment of the present invention. In this embodiment, a B-tree 1002 organizes nodes referenced by term and row identifier pairs. As before, candidate rows determined as in step 706 of FIG. 7 can be used in conjunction with the requested search term in order to narrow the possibilities of {term, row identifier} pairs to consult and therefore accelerate processing of the positional text condition. Each {term, row identifier} pair references a corresponding logical structure 1004a and 1004b that identifies the positions at which the term is present for the corresponding row, using similar non-limiting exemplary mechanisms to those described before (e.g., '#pos: 3', '18', '77', '190', denoting the term appears in three positions (18, 77, and 190) within the corresponding row).

Figure 11:
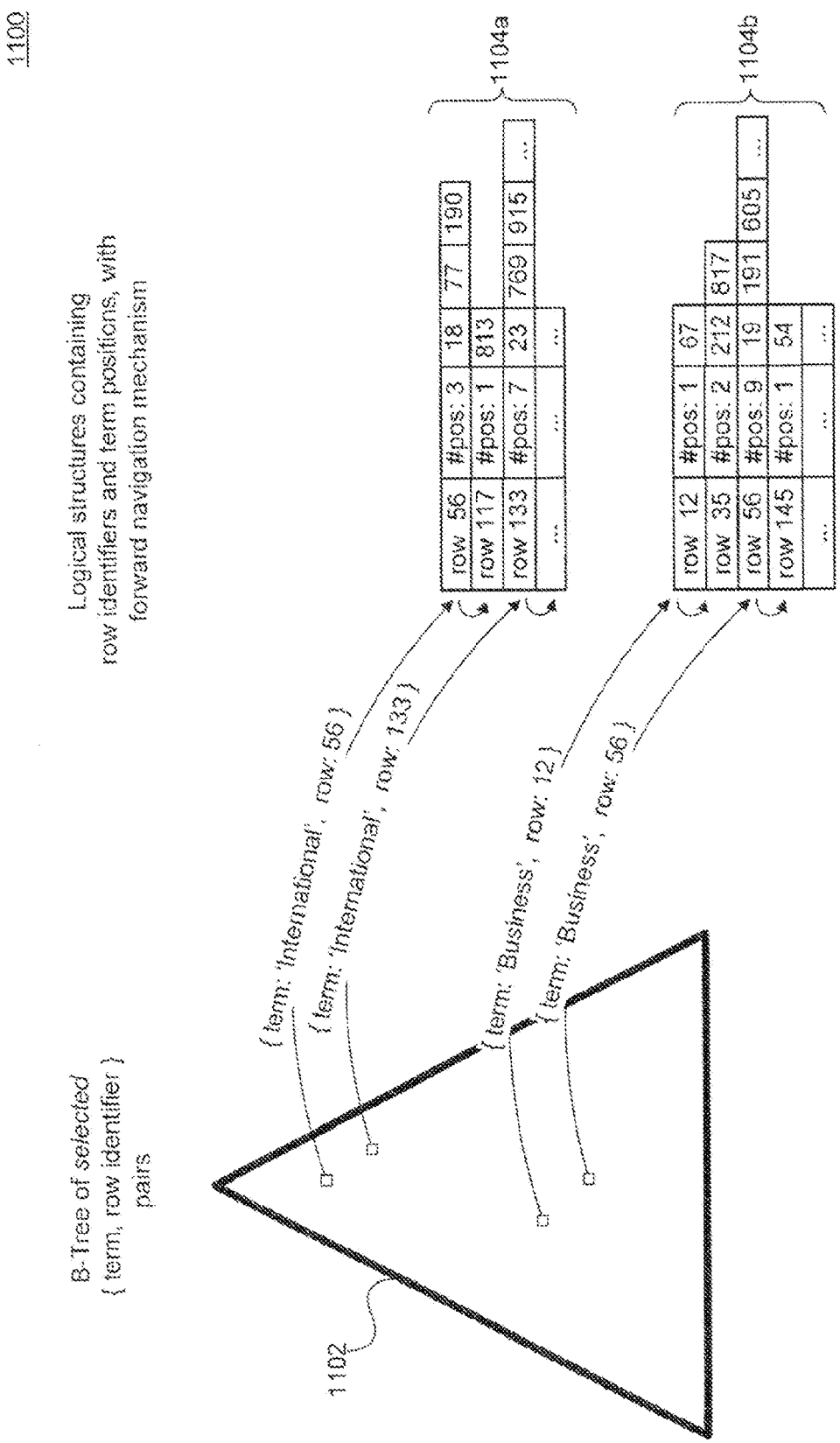
FIG. 11 illustrates an additional positional text index structure that provides a forward navigation mechanism, in accordance with an additional embodiment of the present invention.

FIG. 11 illustrates an additional positional text index structure 1100 that provides a forward navigation mechanism, in accordance with an additional embodiment of the present invention. As with positional text index structure 1000 of FIG. 10, FIG. 11 details the use of a B-tree 1102 of {term, row identifier} pairs. However, in analogous manner to the B-tree 502 of FIG. 5A, a reduction of space required for storage of B-tree 1102 is achieved by only indexing a selection of {term, row identifier} pairs. Logical structures 1104a and 1104b then employ a forward navigation mechanism allowing access to rows and positions for a search term that are not part of the selection in B-tree 1102.

VI. Example Computer System Implementation

Figure 12:
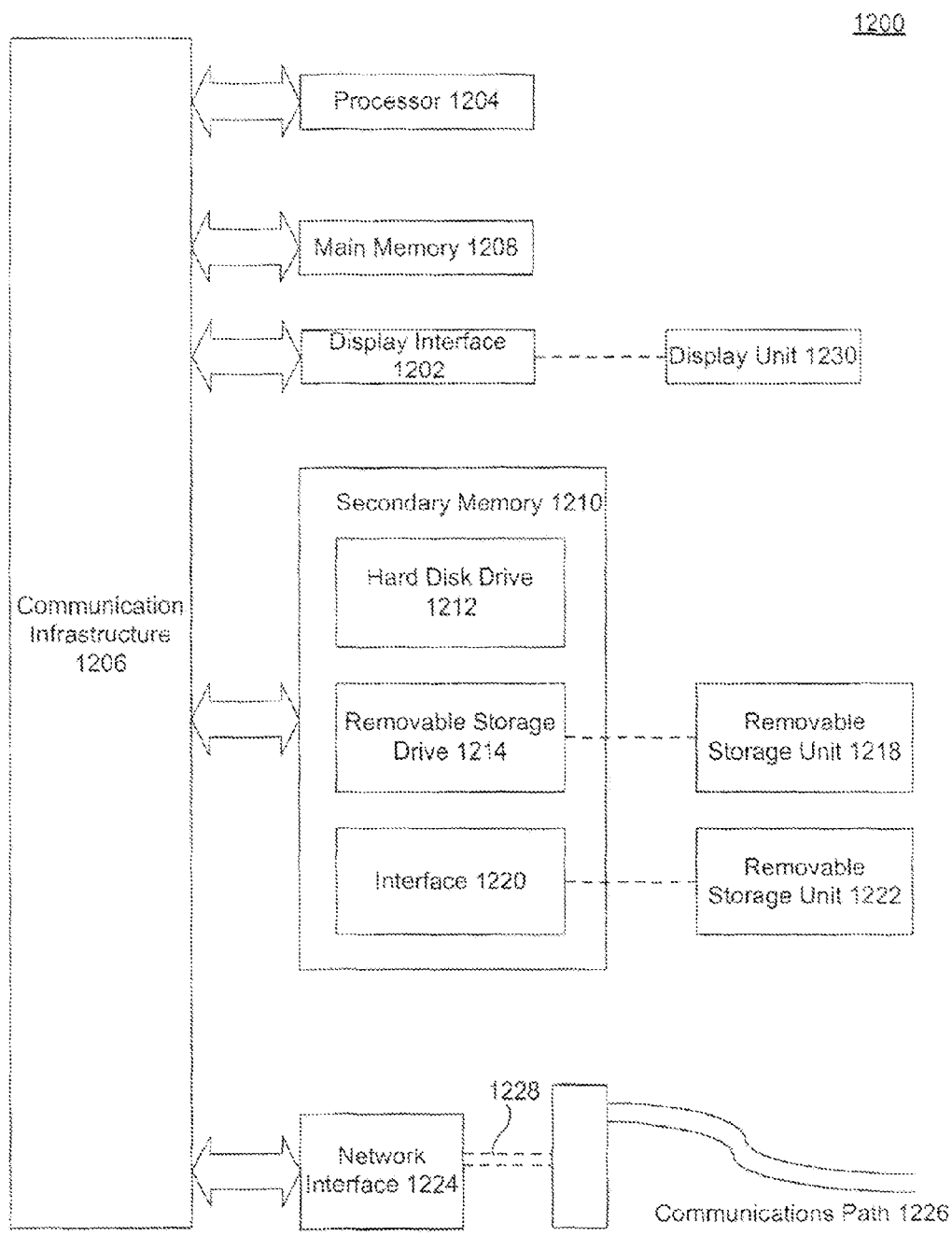
FIG. 12 depicts an example computer system in which embodiments of the present invention may be implemented.

Various aspects of the present invention can be implemented by software, firmware, hardware, or a combination thereof. FIG. 12 illustrates an example computer system 1200 in which the present invention, or portions thereof, can be implemented as computer-readable code. For example, the methods illustrated by flowcharts 600 of FIGS. 6 and 700 of FIG. 7, can be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus or network).

Computer system 1200 also includes a main memory 1208, preferably random access memory (RAM), and may also include a secondary memory 1210. Secondary memory 1210 may include, for example, a hard disk drive 1212, a removable storage drive 1214, and/or a memory stick. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. that is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 that allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals that may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Signals carried over communications path 1226 can also embody the logic described herein. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowcharts 600 of FIGS. 6 and 700 of FIG. 7, discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212 or communications interface 1224.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VII. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
    retrieving a first search term bitmap representing rows in a database based on a first search term from a query;
    retrieving a second search term bitmap representing rows in the database based on a second search term from the query;
    identifying candidate rows based on an intersection of the first search term bitmap and the second search term bitmap;
    evaluating position information for the first search term and the second search term for the candidate rows, wherein the position information for the first search term and the second search term comprises a location within a row of the corresponding term and is accessed through a data structure of the database accepting a term-row-position information triplet; and
    providing a set of result rows comprising rows of the candidate rows satisfying a positional text condition from the query based on the location of the term within a row for the first search term and the second search term.

2. The method of claim 1, wherein providing the set of result rows comprises:
    providing a result bitmap representing the set of result rows.

3. The method of claim 2, further comprising:
    evaluating a subsequent condition restricted by the bitmap representing the set of result rows.

4. The method of claim 1, wherein identifying the candidate rows comprises:
    identifying the candidate rows based on an intersection of the first search term bitmap and the second search term bitmap with a prior condition bitmap.

5. The method of claim 1, wherein providing the set of result rows comprises:
    providing the set of result rows comprising rows of the candidate rows satisfying a phrase condition.

6. The method of claim 1, wherein providing the set of result rows comprises:
    providing the set of result rows comprising rows of the candidate rows satisfying the positional text condition including a proximity condition.

7. A non-transitory computer-readable storage device having instructions recorded thereon, execution of which, by a computing device, causes the computing device to perform operations comprising:
    retrieving a first search term bitmap representing rows in a database based on a first search term from a query;
    retrieving a second search term bitmap representing rows in the database based on the second search term from the query;
    identifying candidate rows based on an intersection of the first search term bitmap and the second search term bitmap;
    evaluating position information for the first search term and the second search term for the candidate rows, wherein the position information for the first search term and the second search term comprises a location within a row of the corresponding term and is accessed through a data structure of the database accepting a term-row-position information triplet; and
    providing a set of result rows comprising rows of the candidate rows satisfying a positional text condition from the query based on the location of the term within a row for the first search term and the second search term.

8. The computer-readable storage device of claim 7, wherein providing the set of result rows comprises:
   providing a result bitmap representing the set of result rows.

9. The computer-readable storage device of claim 8, the method further comprising:
   evaluating a subsequent condition restricted by the bitmap representing the set of result rows.

10. The computer-readable storage device of claim 7, wherein identifying the candidate rows comprises:
    identifying the candidate rows based on an intersection of the first search term bitmap and the second search term bitmap with a prior condition bitmap.

11. The computer-readable storage device of claim 7, wherein providing the set of result rows comprises:
    providing the set of result rows comprising rows of the candidate rows satisfying a phrase condition.

12. The computer-readable storage device of claim 7, wherein providing the set of result rows comprises:
    providing the set of result rows comprising rows of the candidate rows satisfying a proximity condition.

13. A system comprising:
    a memory; and
    a processor configured to:
      retrieve a first search term bitmap representing rows in a database based on a first search term from a query;
      retrieve a second search term bitmap representing rows in the database based on a second search term from the query;
      identify candidate rows based on an intersection of the first search term bitmap and the second search term bitmap;
      evaluate position information for the first search term and the second search term for the candidate rows, wherein the position information for the first search term and the second search term comprises a location within a row of the corresponding term and is accessed through a data structure of the database accepting a term-row-position information triplet; and
      provide a set of result rows comprising rows of the candidate rows satisfying a positional text condition from the query based on the location of the term within a row for the first search term and the second search term.

14. The system of claim 13, wherein providing the set of result rows comprises:
    providing a result bitmap representing the set of result rows.

15. The system of claim 14, wherein the processor is further configured to evaluate a subsequent condition restricted by the bitmap representing the set of result rows.

16. The system of claim 13, wherein identifying the candidate rows comprises:
    identifying the candidate rows based on an intersection of the first search term bitmap and the second search term bitmap with a prior condition bitmap.

17. The system of claim 13, wherein the positional text condition comprises a phrase condition.

18. The system of claim 13, wherein the positional text condition comprises a proximity condition.

* * * * *